(12) United States Patent
Pla Rubio et al.

(10) Patent No.: US 10,167,016 B2
(45) Date of Patent: Jan. 1, 2019

(54) VEHICLE WITH PARK ASSIST

(71) Applicant: Ford Global Technologies, LLC, Dearborn, MI (US)

(72) Inventors: Andrea Pla Rubio, Valencia (ES); Begoña Pla Rubio, Valencia (ES)

(73) Assignee: Ford Global Technologies, LLC, Dearborn, MI (US)

( * ) Notice: Subject to any disclaimer, the term of this patent is extended or adjusted under 35 U.S.C. 154(b) by 58 days.

(21) Appl. No.: 15/204,872

(22) Filed: Jul. 7, 2016

(65) Prior Publication Data
US 2018/0009477 A1  Jan. 11, 2018

(51) Int. Cl.
G08G 1/14 (2006.01)
G01C 21/34 (2006.01)
B62D 13/06 (2006.01)
B62D 15/02 (2006.01)

(52) U.S. Cl.
CPC ................. B62D 15/0285 (2013.01)

(58) Field of Classification Search
CPC ...... B62D 5/0463; B62D 6/008; B62D 7/159; B62D 6/003; B60T 8/1755
USPC ........................................................ 701/41
See application file for complete search history.

(56) References Cited

U.S. PATENT DOCUMENTS

| | | |
|---|---|---|
| 8,180,547 B2 | 5/2012 | Prasad et al. |
| 8,655,551 B2 | 2/2014 | Danz et al. |
| 8,742,947 B2 | 6/2014 | Nakazono et al. |
| 8,744,684 B2 | 6/2014 | Hong et al. |
| 8,825,262 B2 | 9/2014 | Lee et al. |
| 8,957,786 B2 | 2/2015 | Stempnik et al. |
| 9,168,955 B2 | 10/2015 | Noh et al. |
| 2012/0303258 A1 | 11/2012 | Pampus et al. |
| 2016/0068187 A1 | 3/2016 | Hata et al. |

FOREIGN PATENT DOCUMENTS

| | | |
|---|---|---|
| DE | 102005006966 A1 | 9/2005 |
| EP | 2653367 A1 | 10/2013 |
| GB | 2497836 A1 | 12/2012 |
| WO | WO 2006/064544 A1 | 6/2006 |

OTHER PUBLICATIONS

Unpublished pending U.S. Appl. No. 14/991,496, filed Jan. 8, 2016, pursuant to the Commissioner's Notice dated Sep. 21, 2004.
Search Report dated Nov. 28, 2017, for GB Patent Application No. GB 1710916.6 (4 Pages).

*Primary Examiner* — Maceeh Anwari
(74) *Attorney, Agent, or Firm* — James P. Muraff; Neal, Gerber & Eisenberg LLP

(57) ABSTRACT

A vehicle including: motor(s), steering, sensors, processor(s) configured to: (a) load a stored parking spot; (b) via the sensors, map an area leading the vehicle; (c) intersect virtual segments with locations on the map based on (a); (d) compare a current heading, based on (c), to a desired heading, based on (a); (e) automatically recast the vehicle, via the steering based on (d).

21 Claims, 7 Drawing Sheets

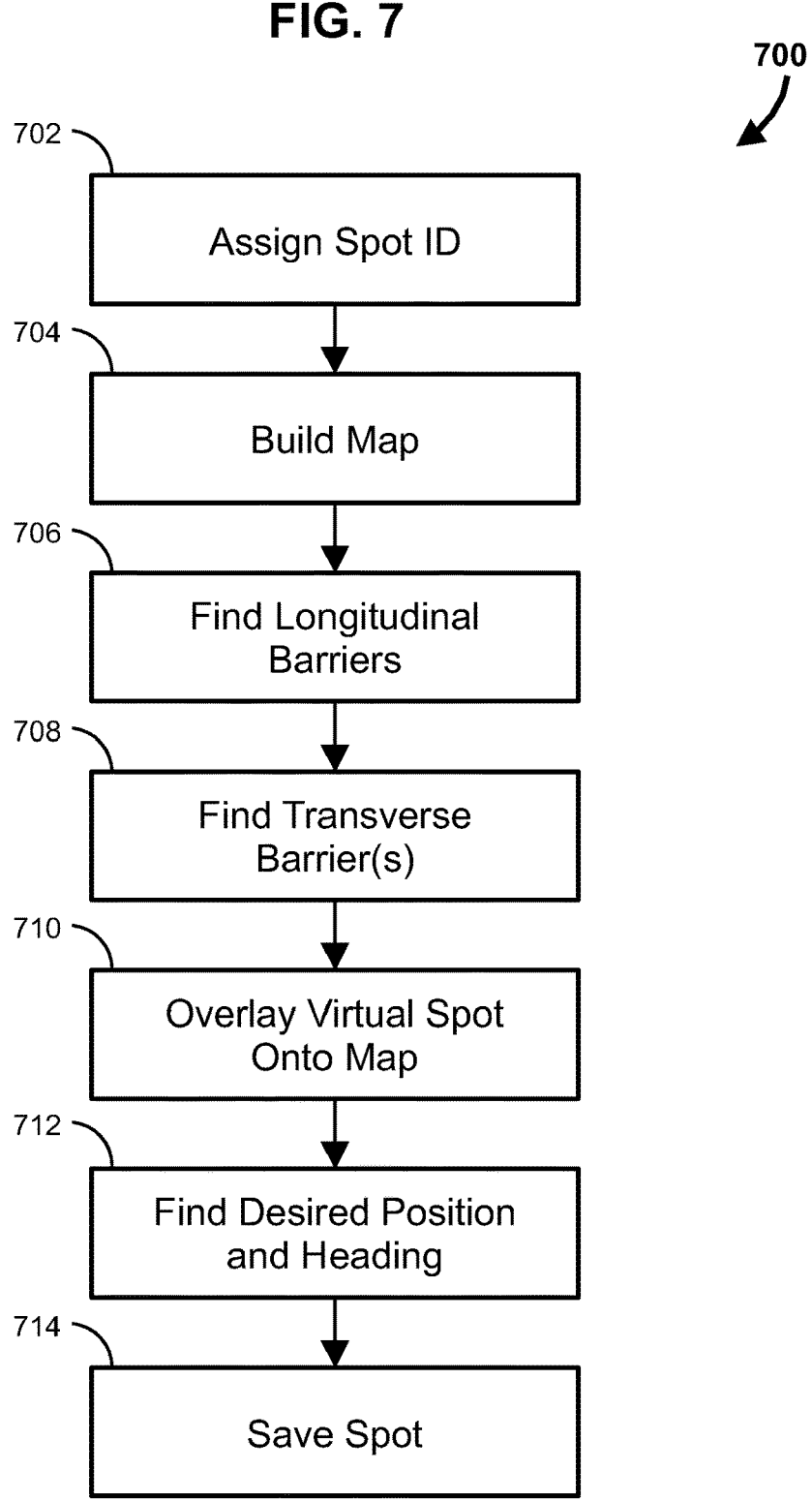

VEHICLE WITH PARK ASSIST

TECHNICAL FIELD

This disclosure relates to assisted parking of a motor vehicle.

BACKGROUND

Prior art automatic parking and/or parking assist programs fail to accurately map positions of vehicles with respect to small or tight parking spots.

SUMMARY

According to various embodiments, a vehicle consistent with the disclosure includes: motor(s), steering, sensors, processor(s) configured to: (a) load a stored parking spot; (b) via the sensors, map an area leading the vehicle; (c) intersect virtual segments with locations on the map based on (a); (d) compare a current heading, based on (c), to a desired heading, based on (a); (e) automatically recast the vehicle, via the steering based on (d).

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 7 is a block diagram of a method of saving a parking spot.

DETAILED DESCRIPTION OF EXAMPLE EMBODIMENTS

Figure 1:
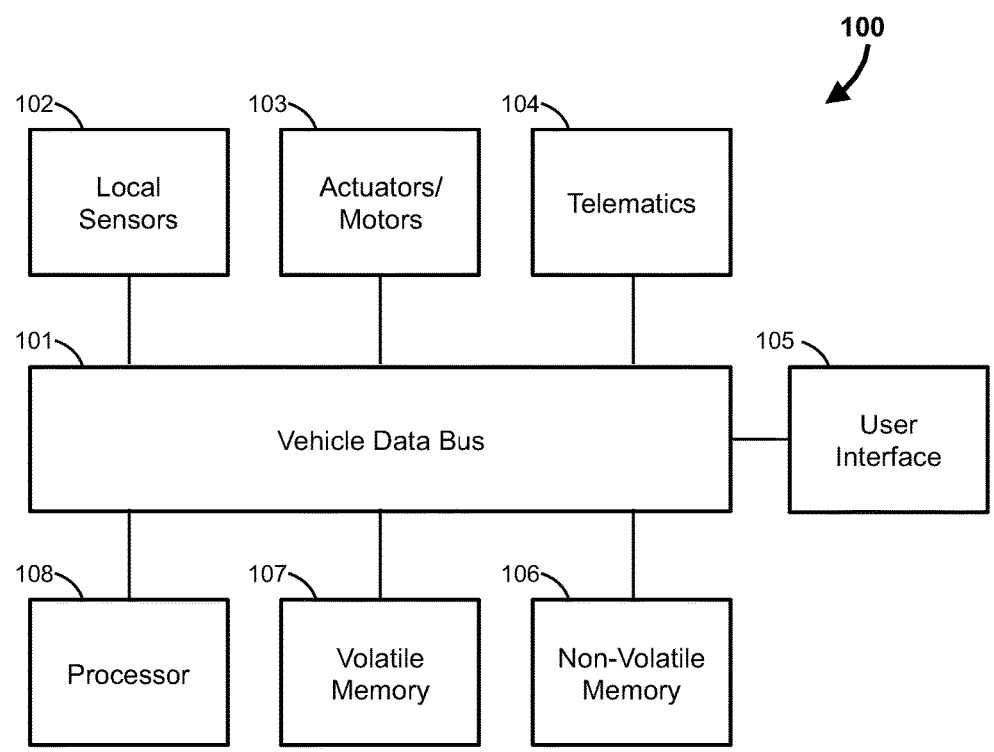
FIG. 1 is a block diagram of a vehicle computing system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

FIG. 1 shows a computing system 100 of an example vehicle 200. The vehicle 200 is also referred to as a first vehicle 200. The vehicle 200 includes a motor, a battery, at least one wheel driven by the motor, and a steering system configured to turn the at least one wheel about an axis. Suitable vehicles are also described, for example, in U.S. patent application Ser. No. 14/991,496 to Miller et al. ("Miller") and U.S. Pat. No. 8,180,547 to Prasad et al. ("Prasad"), both of which are hereby incorporated by reference in their entireties. The computing system 100 enables automatic control of mechanical systems within the device. It also enables communication with external devices. The computing system 100 includes a data bus 101, one or more processors 108, volatile memory 107, non-volatile memory 106, user interfaces 105, a telematics unit 104, actuators and motors 103, and local sensors 102.

The data bus 101 traffics electronic signals or data between the electronic components. The processor 108 performs operations on the electronic signals or data to produce modified electronic signals or data. The volatile memory 107 stores data for immediate recall by the processor 108. The non-volatile memory 106 stores data for recall to the volatile memory 107 and/or the processor 108. The non-volatile memory 106 includes a range of non-volatile memories including hard drives, SSDs, DVDs, Blu-Rays, etc. The user interface 105 includes displays, touch-screen displays, keyboards, buttons, and other devices that enable user interaction with the computing system. The telematics unit 104 enables both wired and wireless communication with external processors via Bluetooth, cellular data (e.g., 3G, LTE), USB, etc. The telematics unit 104 may be configured to broadcast signals at a certain frequency (e.g., one type of vehicle to vehicle transmission at 1 kHz or 200 kHz, depending on calculations described below). The actuators/motors 103 produce physical results. Examples of actuators/motors include fuel injectors, steering, a motor for transmitting torque to wheels, windshield wipers, brake light circuits, transmissions, airbags, haptic motors or engines etc. The local sensors 102 transmit digital readings or measurements to the processor 108. Examples of suitable sensors include temperature sensors, rotation sensors, seatbelt sensors, speed sensors, cameras, lidar sensors, radar sensors, ultrasonic sensors, infrared sensors, etc. It should be appreciated that the various connected components of FIG. 1 may include separate or dedicated processors and memory. Further detail of the structure and operations of the computing system 100 is described, for example, in Miller and/or Prasad.

Figure 2:
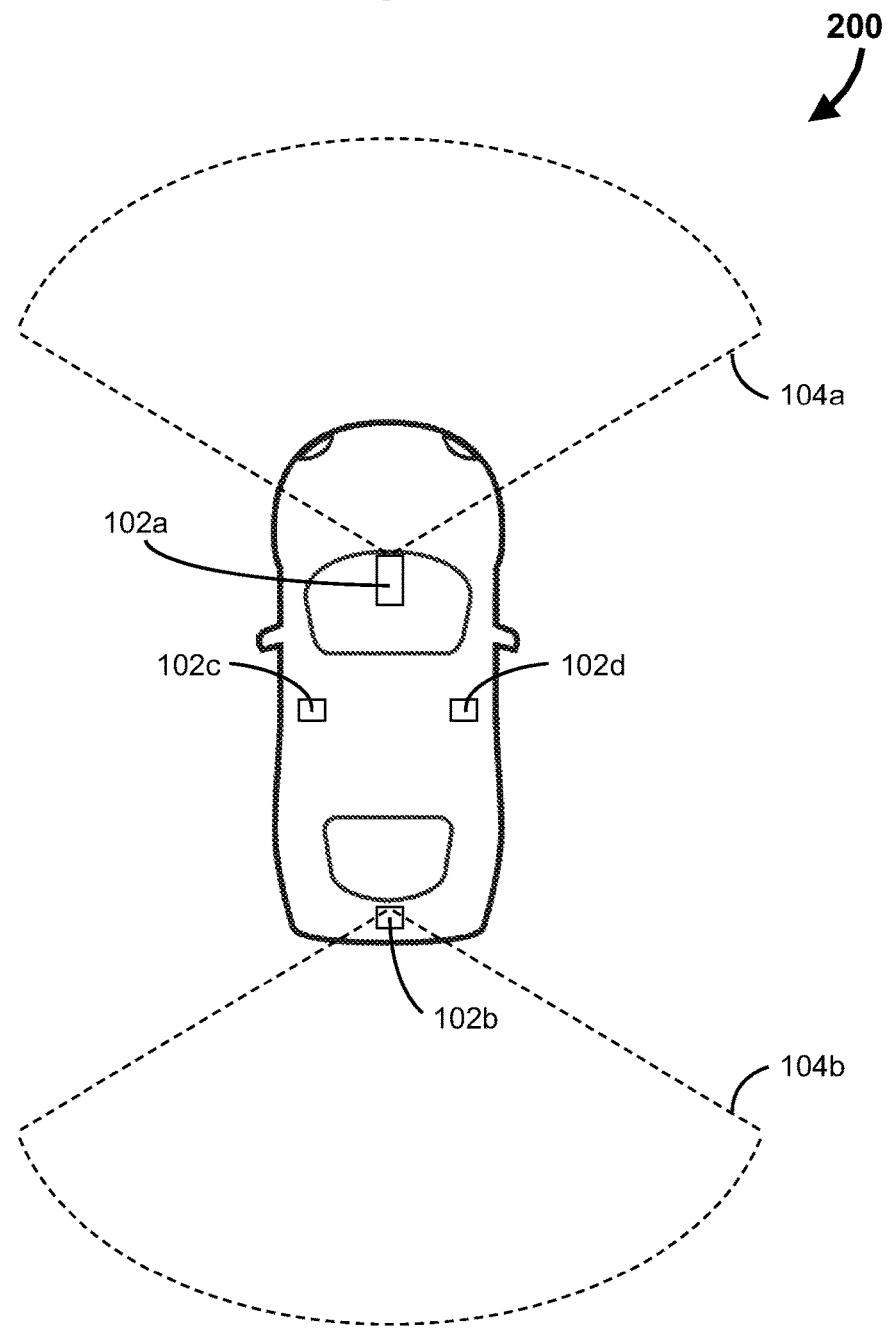
FIG. 2 is a schematic of a vehicle including the vehicle computing system.

FIG. 2 generally shows and illustrates the vehicle 200, which includes the computing system 100. Although not shown, the vehicle 200 is in operative wireless communication with a nomadic device, such as a mobile phone. Some of the local sensors 102 are mounted on the exterior of the vehicle 200. Local sensor 102a may be an ultrasonic sensor, a lidar sensor, a camera, a video camera, and/or a microphone, etc. Local sensor 102a may be configured to detect objects leading the vehicle 200 as indicated by leading sensing range 104a. Local sensor 102b may include one or more of an ultrasonic sensor, a lidar sensor, an infrared sensor, a camera, a video camera, and/or a microphone, etc. Local sensor 102b may be configured to detect objects trailing the vehicle 200 as indicated by leading sensing range 104b. Left sensor 102c and right sensor 102d may be configured to perform the same functions for the left and right sides of the vehicle 200. The vehicle 200 includes a host of other sensors 102 located in the vehicle interior or on the vehicle exterior. These sensors may include any or all of the sensors disclosed in Prasad.

It should be appreciated that the vehicle 200 is configured to perform the methods and operations described below. In some cases, the vehicle 200 is configured to perform these functions via computer programs stored on the volatile and/or non-volatile memories of the computing system 100. A processor is "configured to" perform a disclosed operation when the processor is in operative communication with memory storing a software program with code or instructions embodying the disclosed operation. Further description of how the processor, memories, and programs cooperate appears in Prasad. It should be appreciated that the nomadic device or an external server in operative communication with the vehicle 200 perform some or all of the methods and operations discussed below.

According to various embodiments, the vehicle 200 is the vehicle 100a of Prasad. In various embodiments, the computing system 100 is the VCCS 102 of FIG. 2 of Prasad. In various embodiments, the vehicle 200 is in communication with some or all of the devices shown in FIG. 1 of Prasad, including the nomadic device 110, the communication tower 116, the telecom network 118, the Internet 120, and the data processing center 122.

The term "loaded vehicle," when used in the claims, is hereby defined to mean: "a vehicle including: a motor, a plurality of wheels, a power source, and a steering system; wherein the motor transmits torque to at least one of the plurality of wheels, thereby driving the at least one of the plurality of wheels; wherein the power source supplies energy to the motor; and wherein the steering system is configured to steer at least one of the plurality of wheels." The term "equipped electric vehicle," when used in the claims, is hereby defined to mean "a vehicle including: a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels."

Figure 3:
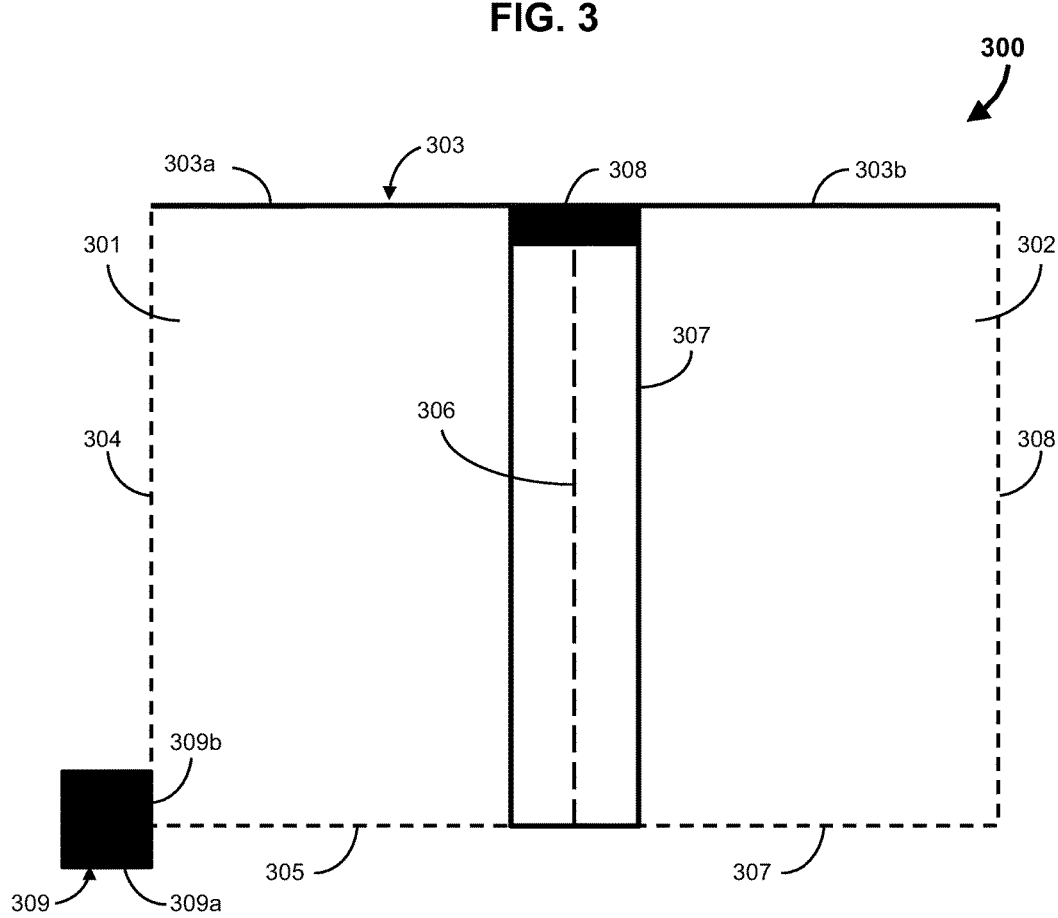
FIG. 3 is a virtual map of a level of a parking garage.

FIG. 3 shows a top view of one level 300 of a covered parking garage (e.g., an underground parking garage), which includes a concrete base wall 303 and a concrete pillar 309. FIG. 3 represents an actual, physical view of the level 300 and a virtual model of the level 300. The level 300 includes a first parking spot 301 and a second parking spot 302. The first parking spot 301 is defined by a first portion 303a of the concrete base wall 303, a painted divider line 306, the pillar 309, and painted divider line 310. Lines 304 and 305 may be marked or unmarked (i.e., painted or unpainted). Line 304 longitudinally extends to the first portion 303a along a second wall 309b of the pillar 309. Line 305 transversely extends to the painted divider line 306 from the midpoint of the second wall 309b of the pillar 309. The second parking spot 302 is defined by a second portion 303b of the concrete base wall 303, the painted longitudinal divider line 306, and painted lines 311 and 312.

A projector 308 is mounted to the concrete base wall. The projector 308 generates or broadcasts a virtual wall 307 above the painted divider line 306. Although the virtual wall 307 is shown as being wider than the divider line 306, such a configuration is purely illustrative. In practice, the virtual wall 307 may have the same width as the divider line 306 or a narrower width than the divider line 306. The virtual wall 307 may be a beam of light. In a preferred embodiment, the virtual wall 307 is an infrared beam and the projector 308 is an infrared beam generator. According to various embodiments, the projector 308 is mounted, and then the divider line 306 is painted from a midpoint of the projector 308.

It should thus be appreciated that the first parking spot 301 has (a) an end boundary equal to first portion 303a, (b) a left boundary equal to line 304, (c) a right boundary equal to virtual wall 307, and (d) a front boundary equal to line 305. The parking assist program is configured to align the vehicle 200 with one of the parking spots 301, 302. This disclosure discusses maneuvering with respect to the first parking spot 301 as an example. Once the parking assist program has aligned the vehicle with the first parking spot 301, a driver of the vehicle 200 may pull the vehicle into the first parking spot 301. Alternatively, the vehicle 200 may autonomously pull into the first parking spot 301.

As stated above, the vehicle 200 includes local sensor 102a configured to detect area directly leading the vehicle 200. In a preferred embodiment, the local sensor 102a includes ultrasonic sensors and IR beam sensors. The ultrasonic sensors of local sensor 102a detect physical barriers surrounding the parking spot, such as the pillar 309 and the concrete base wall 303. The IR sensors detect the virtual wall 307. It should be appreciated that any suitable combination of sensors may be used to map the area leading the vehicle 200.

After mapping the area leading the vehicle 200, the parking assist program draws or extends virtual segments 403a to 403d on the virtual map of the area. The parking assist program extends a first virtual segment 403a from a first point 180a of the vehicle 200 until the first virtual segment 403a intersects (i.e., is incident upon) a stored longitudinal location 401a along the left boundary. Similarly, the parking assist program extends a fourth virtual segment 403d from a second point 180b of the vehicle 200 until the fourth virtual segment 403d intersects (i.e., is incident upon) a stored longitudinal location 401c along the right boundary. The parking assist program extends a second virtual segment 403b from the first point 180a to a stored transverse location 401b along the end boundary. The parking assist program extends a third virtual segment 403c from the second point 180b to the same stored transverse location 401b such that the second virtual segment 403b and the third virtual segment 403c terminate at the same point.

The parking assist program calculates: lengths of the first, second, third, and fourth segments 403a to 403d; a first angle 402a between the first segment 403a and the second segment 403b; a second angle 402b between the second segment 403b and the third segment 403c; and a third angle 402c between the third segment 403c and the fourth segment 403d.

Once the segment lengths 403a to 403d and the angles 402a to 402c have been calculated, the parking assist program finds a current location 503a and heading 503b of the vehicle 200. It should be appreciated that one of ordinary skill in the art would be able to compute or find the current location 503a and the heading 503b given the segment lengths 403a to 403d and/or the angles 402a to 402c.

Figure 5A:
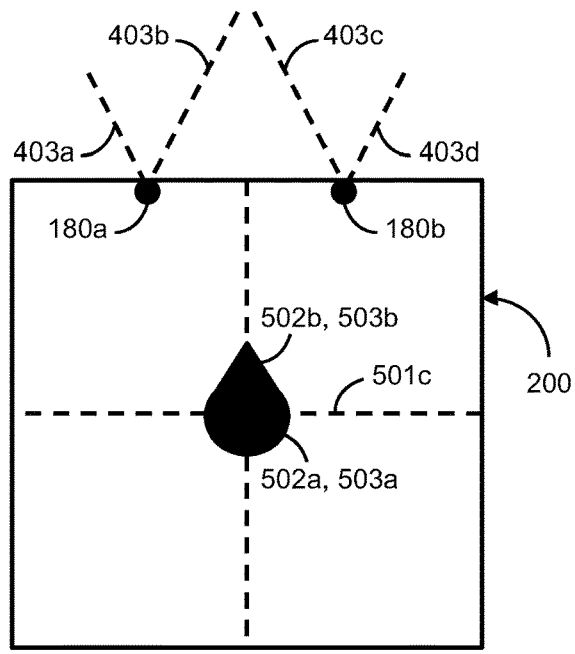
FIGS. 5a and 5b are virtual heading maps of the vehicle.
Figure 5B:
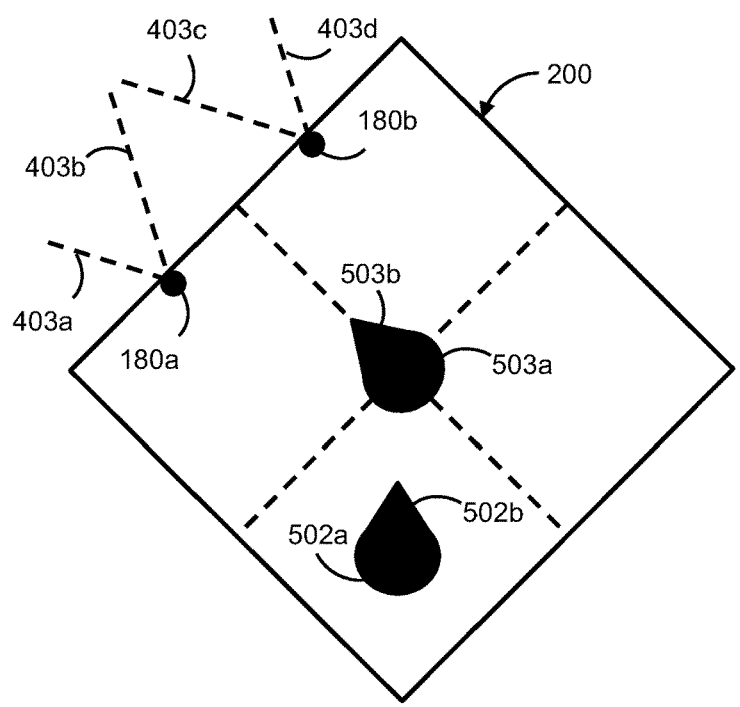

FIGS. 5a and 5b are heading maps generated by the parking assist program. In FIG. 5a, a current position 503a and heading 503b of the vehicle 200 match (i.e., are aligned with) a desired position 502a and heading 502b of the vehicle 200. As stated above, once the vehicle 200 is aligned, the driver (or a program) may pull the vehicle forward into the parking spot.

In FIG. 5b, the current position 503a and heading 503b do not match (i.e., mismatch) the desired position 502a and heading 502*b*. Thus, in FIG. 5*b*, the vehicle 200 will execute one or more maneuvers until the current position 503*a* and heading 503*b* of the vehicle 200 match the desired position 502*a* and heading 502*b*. It should be appreciated that software to generate a series of maneuvers that recast a vehicle from a first position and heading to a second position and heading is known in the art.

Figure 6:
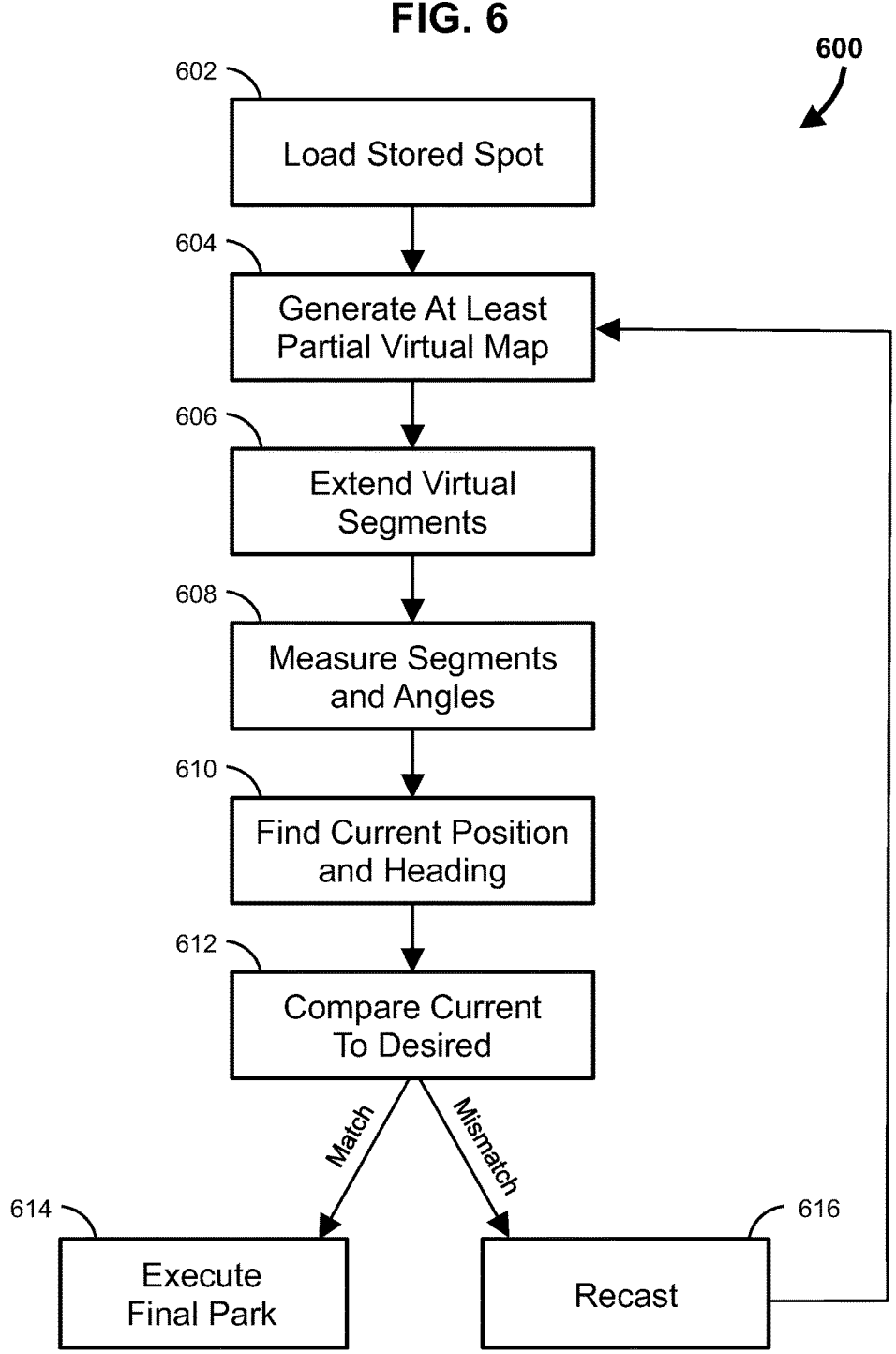
FIG. 6 is a block diagram of a method of parking the vehicle.

FIG. 6 illustrates a method 600 performed by the parking assist program. The method 600 generally reflects the processes described above and is configured to maneuver or recast the vehicle 200 until the current position and heading 503 match the desired position and heading 502.

Figure 4:
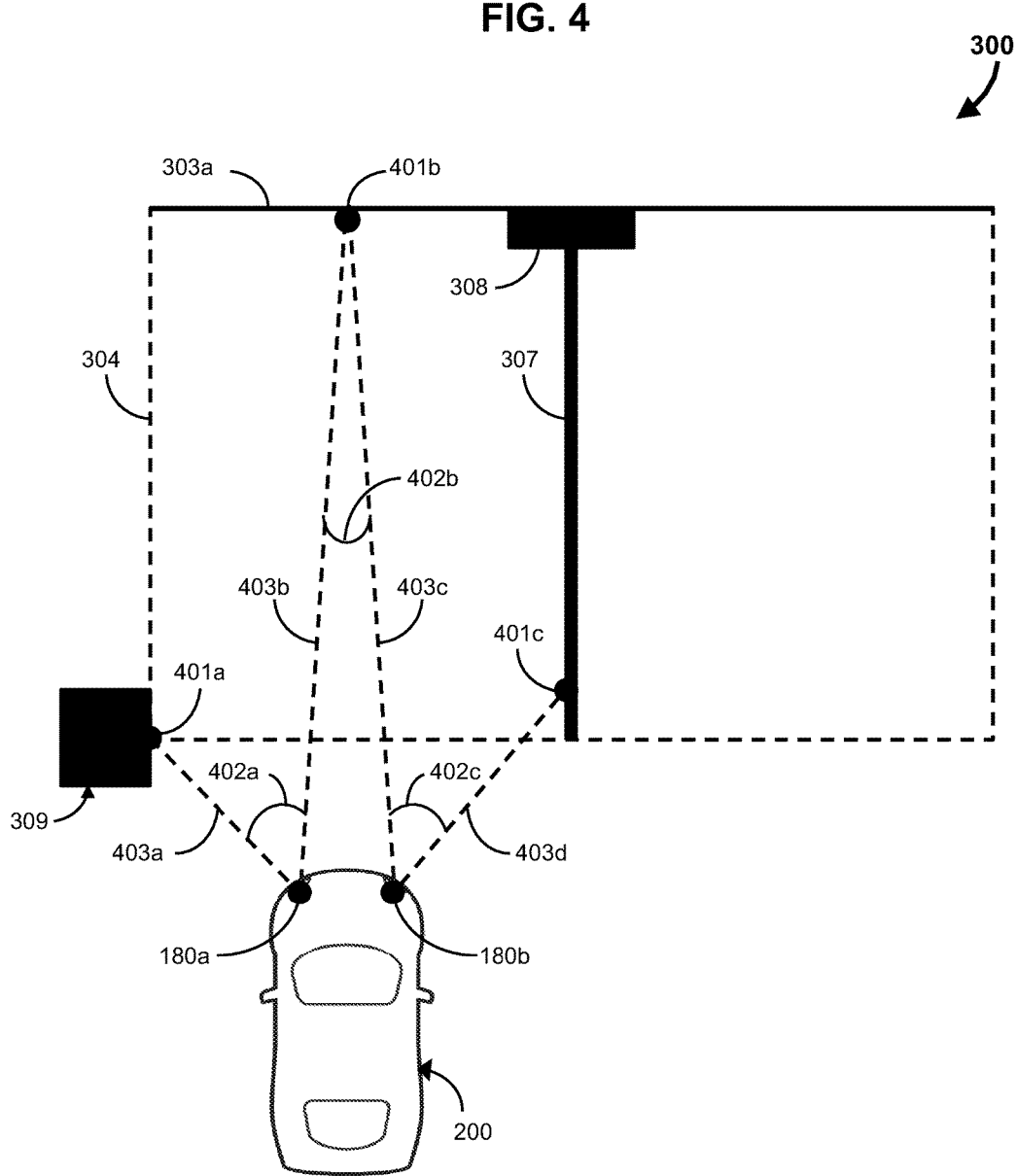
FIG. 4 is the virtual map of the level of the parking garage with virtual segments extended from the vehicle.

At block 602, in response to a user command, the parking assist program loads a stored parking spot from a menu of stored spots. The loaded stored spot includes the longitudinal locations of intersection points 401*a* and 401*c* in addition to the transverse location of intersection point 401*b*. At block 604, the parking assist program consults the local vehicle sensors 102 to generate a virtual map of the parking spot (e.g., the virtual map shown in FIG. 4), including the left boundary, right boundary, and end boundary.

According to various embodiments, the parking assist program does not need to create a complete virtual map of the parking spot at this block. According to these embodiments, the parking assist program only needs to map the spot such that the parking assist program can locate at least two of the intersection points (e.g., the vehicle 200 may be positioned such that the local sensors 102 only map the pillar 309 and the concrete base wall 303). According to various embodiments, the parking assist program is configured to recast the vehicle with reference to only two of the four virtual segments 403, but requires all four virtual segments to be placed on the virtual map before executing final park.

At block 606, the parking assist program extends the virtual segments 403 from points 180*a* and 180*b* to the loaded intersection points 401*a*, 401*b*, and 402*c*. It should be appreciated that if the parking assist program only generated a partial virtual map, then the parking assist program extends the virtual segments to the mapped intersection points. According to various embodiments, the parking assist program overlays the currently mapped parking spot onto the stored map of the parking spot. According to various embodiments, the parking assist program performs the overlay by matching or correlating physical properties (e.g., the beam of infrared light 307 or the pillar 309) of the currently mapped parking spot with physical properties of the stored parking spot.

At block 608, the parking assist program measures the lengths of the extended virtual segments 403 and the values of the angles 402 between the extended virtual segments. At block 610, the parking assist program computes the current position 503*a* and heading 503*b* of the vehicle 200 based on the lengths of the virtual segments 403 and the values of the angles 402. At block 612, the parking assist program compares the current position and heading 503 of the vehicle 200 to the desired position and heading 502 of the vehicle 200. The desired position and heading 502 of the vehicle are associated with the loaded stored spot.

At block 614, the parking assist program decides, based on the comparison, whether the current position and heading sufficiently match (within predetermined limits) the desired position and heading. If the current position and heading sufficiently match, then the parking assist program executes final park at block 614. If the current position and heading are a mismatch (i.e., do not sufficiently match), then the parking assist program automatically repositions or recasts the vehicle 200 based on the current position and heading 503 and the desired position and heading 502 at block 616. After block 616, the parking assist program returns to block 604.

If the vehicle 200 is autonomous, then final park causes the vehicle 200 to automatically pull forward and stop within the parking spot. If the vehicle 200 is partially autonomous or manual, then final park may presents an instruction on the user interface 105 informing the driver that the car has been properly aligned and that the driver may full forward into the parking spot.

It should be appreciated that although the desired position 502*a* of the vehicle 200 is shown as a point, the desired position may be a series of points (e.g., points on a line bisecting the parking spot that are at least a predetermined distance from the end boundary and/or the front boundary of the parking spot, such that none of the points are located inside of the parking spot).

FIG. 7 generally shows and illustrates an example method 700 of storing a new parking spot via the parking assist program. The method 700 enables the vehicle to set the intersection points 401, the desired position 402*a*, and the desired heading 402*b*.

At block 702, the driver assigns a spot ID to a new parking spot. For example, the driver may select a blank spot ID from a menu of spot IDs presented on the user interface 105. At block 704, the parking assist program informs the driver that a complete map of all sides of the spot is required. The driver, or the parking assist program, now recasts the vehicle 200 until the sensors have generated a complete physical map of the area surrounding the parking spot. Some of the recasts may involve the driver manually parking the vehicle.

At block 706, the parking assist program finds longitudinal barriers of the parking spot (e.g., the pillar 309 and the virtual wall 307). At block 706, the parking assist program extends the left and right sides of the spot such that the spot does not include any portion of the longitudinal barriers. At block 708, the parking assist program finds the transverse barrier and extends the end of the spot between the left and right sides of the spot such that the spot does not include any portion of the transverse barrier (e.g., if the concrete base wall 303 was convexly curved (curving away from the spot), then the parking assist program would extend the end of the spot tangent to the curve, if the concrete base wall was concavely curved (curving toward the spot), then the end of the spot would not be tangent to the curve).

At block 710, the parking assist program overlays left, right, and end virtual boundaries of the parking spot onto the generated map and ensures that no obstacle occupies any portion of the spot. At block 710, the parking assist program confirms that the spot satisfies predetermined dimensions.

According to various embodiments, blocks 706, 708, 710 occur simultaneously (or substantially simultaneously) with block 704 such that the results of blocks 706, 708, and 710 inform the parking assist program as to whether the spot has been completely mapped. More specifically, the parking assist program may determine that the parking spot has been completely mapped when the parking assist program is able to define a complete parking spot, including left, right, end, and front boundaries over mapped terrain.

According to various embodiments, the parking assist program may enable the driver to draw or reposition one or more of the boundaries on the mapped terrain, if and only if: (a) the parking spot retains certain predetermined length and/or width dimensions, (b) the boundary crosses mapped terrain and does not cross any unknown terrain. According to various embodiments, the parking assist program is configured to automatically set one or more of the boundaries as colinear with painted lines defining the parking spot. The painted lines may be recognized via virtual walls or via image filtering technology applied to images taken via local sensors including cameras.

At block 712, the parking assist program extends a longitudinal line from a midpoint of the end of the spot and selects one or more points along the longitudinal line as the desired location 502*a*. The parking assist program sets the heading of the longitudinal line as the desired heading 502*b*. At block 714, the parking assist program saves the spot.

The invention claimed is:

1. A vehicle comprising:
 motor(s), steering, sensors, processor(s) configured to:
 (a) load a stored parking spot;
 (b) via the sensors, generate a map comprising the stored parking spot;
 (c) intersect virtual segments with intersection points on the map such that two of the virtual segments intersect one of the intersection points;
 (d) compare a current heading, based on (c), to a desired heading, based on (a);
 (e) automatically steer the vehicle based on (d).

2. The vehicle of claim 1, wherein the processor(s) are configured to:
 intersect the virtual segments with predetermined points on the vehicle.

3. The vehicle of claim 1, wherein the loaded stored parking spot includes three intersection points.

4. The vehicle of claim 3, wherein the processor(s) are configured to: intersect four virtual segments with the three intersection points.

5. The vehicle of claim 4, wherein the one of the intersection points intersects a base of the parking spot.

6. The vehicle of claim 5, wherein one of the intersection points intersects a left side of the parking spot and one of the intersection points intersects a right side of the parking spot.

7. The vehicle of claim 1, wherein the processor(s) are configured to: overlay the stored parking spot on the map of an area leading the vehicle.

8. The vehicle of claim 7, wherein at least one of the sensors is configured to detect a beam of infrared light defining a side of the parking spot.

9. The vehicle of claim 8, wherein the processor(s) are configured to: intersect one of the virtual segments with a predetermined location on the detected beam of infrared light.

10. The vehicle of claim 1, wherein the processor(s) is further configured to, subsequent to (c):
 calculate a length of each of the virtual segments and an angle between each pair of the virtual segments; and
 calculate the current heading based at least in part on the length and the angle.

11. The vehicle of claim 1, wherein the map generated by the sensors include at least one first boundary defined by a physical wall, at least one second boundary defined by a virtual wall, and wherein the virtual wall is generated by a projector.

12. The vehicle of claim 1, further comprising at least one user input device, wherein the processor enables a receipt of a user input for drawing or repositioning at least one boundary in the map if: (1) the user input does not alter the size of the stored parking spot; and (2) the at least one boundary does not cross any unknown terrain.

13. A method comprising, via processor(s) of a vehicle including motors, steering, and sensors:
 (a) loading a stored parking spot;
 (b) via the sensors, generating a map comprising some or all of the stored parking spot;
 (c) intersecting virtual segments with intersection points on the map such that two of the virtual segments intersect one of the intersection points;
 (d) comparing a current heading, based on (c), to a desired heading, based on (a);
 (e) automatically steering the vehicle based on (d).

14. The method of claim 13, comprising:
 intersecting the virtual segments with predetermined points on the vehicle.

15. The method of claim 13, wherein the loaded stored parking spot includes three intersection points.

16. The method of claim 15, comprising intersecting four virtual segments with the three intersection points.

17. The method of claim 13, wherein the one of the intersection point intersects a base of the parking spot.

18. The method of claim 17, wherein one of the intersection points intersects a left side of the parking spot and one of the intersection points intersects a right side of the parking spot.

19. The method of claim 13, comprising overlaying the stored parking spot on the map of an area leading the vehicle.

20. The method of claim 19, wherein at least one of the sensors is configured to detect a beam of infrared light defining a side of the parking spot.

21. The method of claim 20, comprising intersecting one of the virtual segments with a predetermined location on the detected beam of infrared light.

* * * * *